United States Patent
Shibata

(10) Patent No.: US 12,489,879 B2
(45) Date of Patent: Dec. 2, 2025

(54) 3D VIDEO SYNTHESIS (ENCODING) METHOD FOR VIEWING 3D (THREE-DIMENSIONAL) 8K IMAGE QUALITY WITH 4K CAMERAS

(71) Applicant: Akira Shibata, Tokyo (JP)

(72) Inventor: Akira Shibata, Tokyo (JP)

( * ) Notice: Subject to any disclaimer, the term of this patent is extended or adjusted under 35 U.S.C. 154(b) by 121 days.

(21) Appl. No.: 18/265,613

(22) PCT Filed: Nov. 22, 2021

(86) PCT No.: PCT/JP2021/044000
§ 371 (c)(1),
(2) Date: Jun. 6, 2023

(87) PCT Pub. No.: WO2022/124149
PCT Pub. Date: Jun. 16, 2022

(65) Prior Publication Data
US 2024/0031553 A1 Jan. 25, 2024

(30) Foreign Application Priority Data
Dec. 10, 2020 (JP) ................................ 2020-005636

(51) Int. Cl.
*H04N 13/351* (2018.01)
*H04N 13/398* (2018.01)
*H04N 19/597* (2014.01)

(52) U.S. Cl.
CPC ......... *H04N 13/351* (2018.05); *H04N 13/398* (2018.05); *H04N 19/597* (2014.11)

(58) Field of Classification Search
CPC .. H04N 13/351; H04N 13/398; H04N 19/597; H04N 13/339; H04N 13/139; H04N 13/161
See application file for complete search history.

(56) References Cited

U.S. PATENT DOCUMENTS

| | | | | |
|---|---|---|---|---|
| 10,298,904 | B1 * | 5/2019 | Dolgoff | H04N 13/194 |
| 2003/0223499 | A1 * | 12/2003 | Routhier | H04N 13/341 |
| | | | | 348/E13.068 |

(Continued)

FOREIGN PATENT DOCUMENTS

| JP | 60-48691 A | 3/1985 |
|---|---|---|
| JP | 7-15752 A | 1/1995 |
| JP | 2006-67596 A | 3/2006 |

*Primary Examiner* — Daniel F Hajnik
*Assistant Examiner* — Adeel Bashir

(57) ABSTRACT

Disclosed is a system capable of synthesizing (encoding) two images taken by two left and right cameras into a 3D video, and viewing the 3D image on a display. The system comprises a computer that uses two cameras with a resolution equivalent to half the number of horizontal pixels of a 3D display, to execute an application program, and arrange each pixel of the two cameras on pixels equivalent to the display. The checkered pattern configuration means that the pixels of the first scan line of the left camera are configured sequentially by skipping one position on the first scan line (odd-numbered rows) of the display, that is, only configured in odd-numbered columns; the pixels of the first scanning line of the right camera skip one position from the second column on the second scanning line (even-numbered row) of the display, that is, only configured in even-numbered.

2 Claims, 3 Drawing Sheets

(56) References Cited

U.S. PATENT DOCUMENTS

Figure 1:
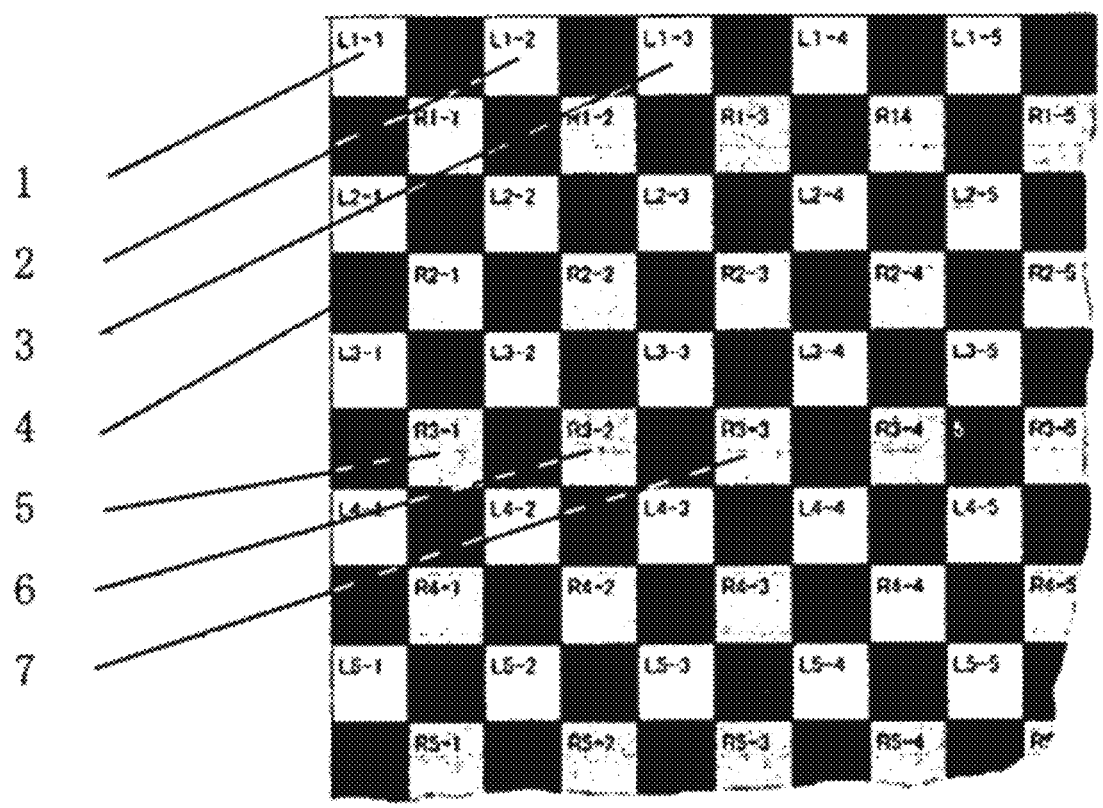

| | | | |
|---|---|---|---|
| 2008/0252719 A1* | 10/2008 | Choi | H04N 13/207 |
| | | | 348/E13.001 |
| 2010/0045782 A1* | 2/2010 | Morita | H04N 13/156 |
| | | | 348/51 |
| 2011/0187821 A1* | 8/2011 | Routhier | H04N 13/161 |
| | | | 348/43 |
| 2015/0237373 A1* | 8/2015 | Tourapis | H04N 19/132 |
| | | | 375/240.01 |
| 2018/0146185 A1* | 5/2018 | Husak | H04N 13/194 |
| 2019/0037209 A1* | 1/2019 | Kobayashi | H04N 13/15 |

\* cited by examiner

FIG. 2

FIG. 3

3D VIDEO SYNTHESIS (ENCODING) METHOD FOR VIEWING 3D (THREE-DIMENSIONAL) 8K IMAGE QUALITY WITH 4K CAMERAS

1. TECHNICAL FIELD

The invention relates to the technical field of a method that synthesizes (encodes) two images captured by two left and right cameras into one 3D video, and views (listens) as a 3D image on a display.

2. BACKGROUND ART

In the past, 3D video compositing (encoding) has the following methods: methods corresponding to row double lines, side double sides, top and bottom, frame sequence (encapsulation), parallax barrier, display using lenticular lenses. In any of these, the output resolution of the camera is used which is the same as or higher than the display resolution of the monitor. There are no prior art documents.

In 3D video compositing (encoding) methods using side-by-side, top and bottom, row bi-line, parallax barrier and lenticular displays, in the left and right videos, half (50%) of the camera's total pixels are used to make the 3D video stream during 3D compositing, and the remaining half of the pixels are discarded.

3. SUMMARY OF THE INVENTION

In order to solve the above problems, the invention provides a 3D video synthesis (encoding) method for viewing 3D (three-dimensional) 8K image quality with 4K cameras.

Use 4K (3960×2160) 3D to display when using two 2K (1980×1080) cameras. Use 8K (7920) 3D to display when using two 4K (3960×2160) cameras. That is, two cameras with a resolution equivalent to half the number of horizontal pixels of the 3D display are used. Then, an application program that configures the pixels of the two cameras on the pixel equivalent of the display as follows is executed by a computer or the like. Ichimatsu pattern configuration unit: configure the pixels of the first scan line of the left camera on the first scan line (odd-numbered rows) of the display in a jumping manner, that is, only configured in odd-numbered columns. The pixels of the first scan line of the right camera are skipped from the second column on the second scan line (even-numbered row) of the display, that is, only configured in even-numbered columns. Thereafter, the left and right camera inputs are similarly assigned to each pixel. As a result, all the pixels of the two cameras are configured, and the same number of blank pixels is configured in an Ichimatsu pattern. Left and right matching unit: in the supplementation of the above blank pixels, calculate the median value of the pixels adjacent to the left and right of the blank pixels, and provide the image information to the blank pixels for supplementation. As a result, on the display, half (50%) is equipped with all the pixels of the two cameras, and the other half satisfies the pixels produced after calculation. Upper and lower degree configuration unit: similarly, in supplementing the blank pixel, the intermediate value of the pixels adjacent to the blank pixel up and down is calculated, and provided and supplemented as image information. As a result, on the display, half (50%) of all the pixels of the two cameras are placed, and the remaining part satisfies the pixels produced after calculation. Effect of design: Ichimatsu pattern configuration unit: using 2 cameras equivalent to 2, you can see 3D images in 4K quality (2K quality for 1K equivalent cameras, 8K quality for 4K cameras) on a display using polarized glasses. Odd-numbered scan lines show the left-eye camera, and even-numbered scan lines show the right-eye camera. However, as 4K image quality, the amount of information is half (50%). Left and right pattern configuration unit: using two 2K-equivalent cameras, you can see 4K-quality (2K-quality for 1K-equivalent cameras, 8K-quality for 4K cameras) 3D images on a display using polarized glasses. Odd-numbered scan lines show the left-eye camera, and even-numbered scan lines show the right-eye camera. Upper and lower pattern configuration unit: using two cameras equivalent to 2K, you can see 4K quality (2-quality for 1K-equivalent cameras, 8K-quality for 4K cameras) 3D images on a display using a parallax barrier lenticular lens. Odd-numbered columns show the left-eye camera, and even-numbered columns show the right-eye camera.

4. BRIEF DESCRIPTION OF ACCOMPANY DRAWINGS

The configuration of pixels on the display screen is represented by a square 1 liter. The top row represents the first scan line. The leftmost column is the first pixel on the scan line. From the upper left of the display to the horizontal and vertical directions, record about 10 pixels each, and then omit it because it is the same repetition.

FIG. 1 is an Ichimatsu pattern configuration of the first Embodiment according to the invention. On the first scan line (odd-numbered rows) of the display, the pixels of the first scan line of the left camera are configured in a jump order, that is, only configured in odd-numbered columns. The pixels of the first scan line of the right camera are skipped from the second column on the second scan line (number of rows) of the display, that is, only configured in even-numbered columns. Thereafter, the left and right camera inputs are similarly assigned to each pixel.

Figure 2:
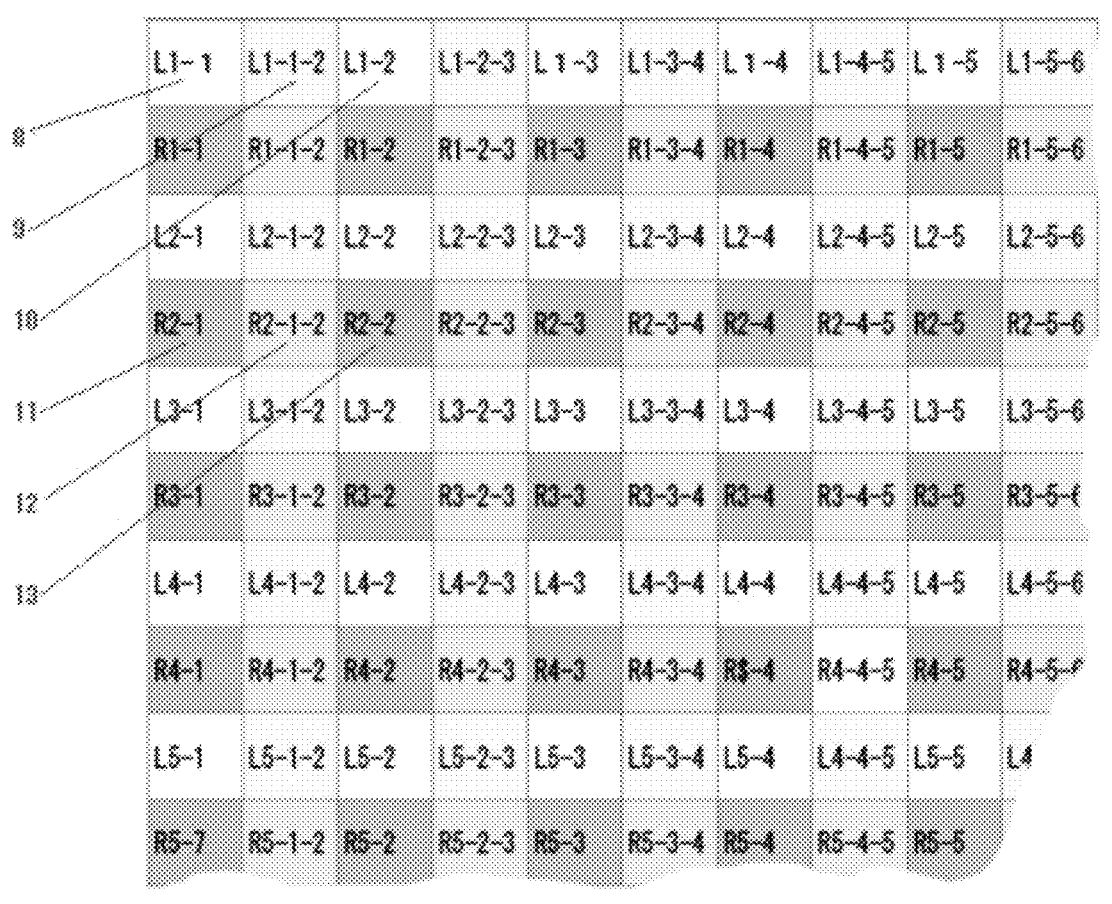

FIG. 2 is a left and right degree configuration of the second Embodiment according to the invention. In the first Embodiment according to the invention, half (50%) of all the pixels of the display do not have video information. Therefore, a blank image without image information uses the image information of its left and right pixels to calculate and assign an intermediate value between them for supplementation. As a result, all pixels displayed have image information.

Figure 3:
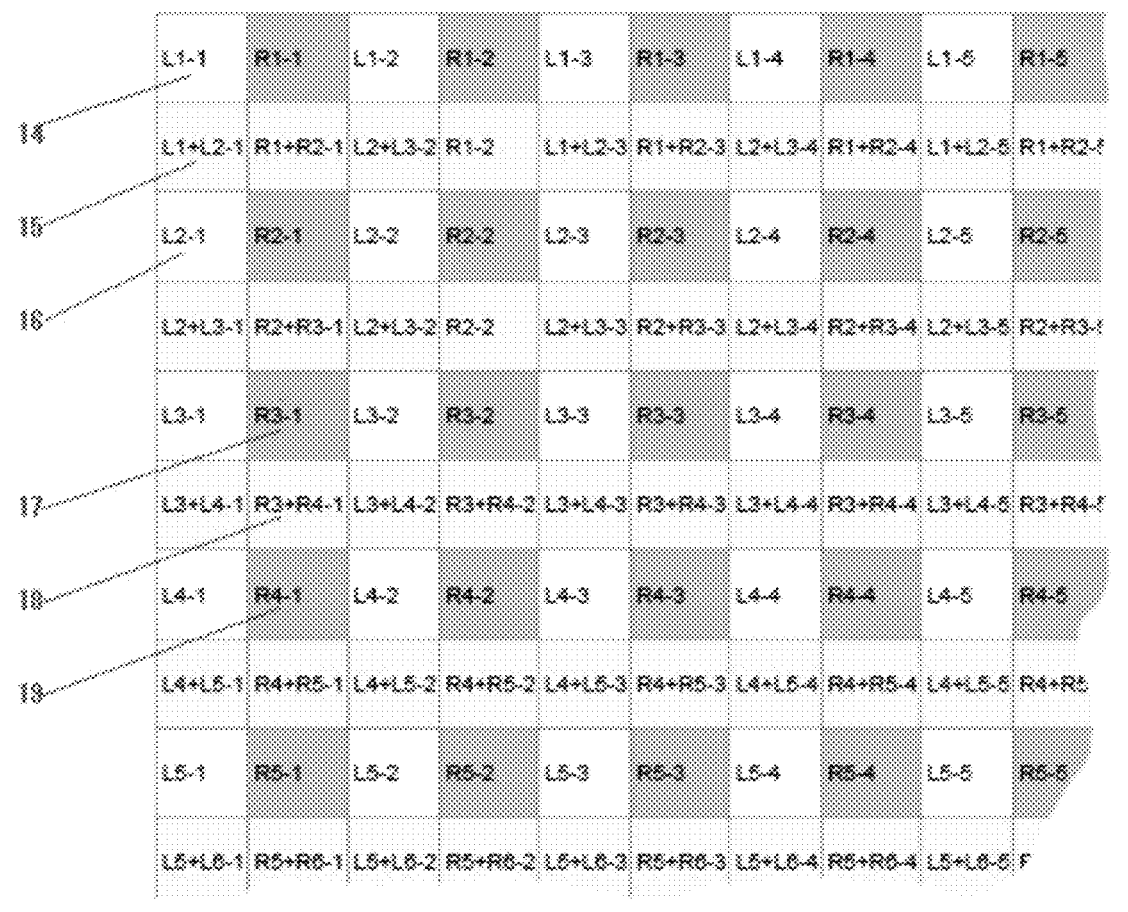

FIG. 3 is an upper and lower degree configuration of the third Embodiment according to the invention. In the first Embodiment according to the invention, half (50%) of all the pixels of the display do not have image information. Therefore, for the blank pixels that does not have image information, use the image information of the pixels above and below to calculate and give the intermediate value of the two to supplement. As a result, all pixels displayed have image information. Install the application program of the invention for implementing the technical solution of the invention on the computer. Insert a capture card that receives video signals from the left and right cameras via HDMI or SDI connections into a computer with a high-speed, multi-core CPU and a high-speed, large-memory GPU. The video stream composited (encoded) into 3D is output from a PC or GPU via HDMI, SDI, USB-typeC, DisplayPort or Sunderbolt.

A square of 1 liter of the table is called a pixel. A set of one pixel arranged in the horizontal direction is called a scan line, and they are called a first scan line and a second scan line in order from the top. A set in which one pixel is arranged vertically is called a column, and they are called a first column and a second column in order from the left. L is the left-eye camera, R is the right-eye camera, the number after L and R is the sequential number of the scan line, and the number after the hyphen is the sequential number of the column. Among them, a pixel with two hyphens like L1-1-2 indicates a sequence number pixel on the scanning line, and is a pixel for which an intermediate value is calculated and supplemented using the pixel. In addition, as shown in L1+L2-1, a pixel with + and a hyphen indicates a pixel whose intermediate value is calculated and supplemented using the pixel of the serial number of the scanning line of the serial number of the column immediately after the hyphen.

Therefore, as shown in the representative embodiments below:
1. L1-1: the first pixel of the first scan line of the left camera;
2. L1-2: the second pixel of the first scan line of the left camera;
3. L1-3: the third pixel of the first scan line of the left camera;
4. pixels with no image signal are displayed in black;
5. R3-1: the first pixel of the third scan line of the right camera;
6. R3-2: the second pixel of the third scan line of the right camera;
7. R3-3: the third pixel of the third scan line of the right camera;
8. L1-1: the first pixel of the first scan line of the left camera;
9. L1-1-2: using the first pixel and second pixel of the first scan line of the left camera to calculate the intermediate value and perform supplementary pixels;
10. L1-2: the second pixel of the first scan line of the left camera;
11. R2-1: the first pixel of the second scan line of the right camera;
12. R2-1-2: using the first pixel and second pixel of the second scan line of the right camera to calculate the intermediate value and perform supplementary pixels;
13. R2-2: the second pixel of the second scan line of the right camera;
14. L1-1: the first pixel of the first scan line of the left camera;
15. L2-1: the first pixel of the second scan line of the left camera;
16. L1+L2-1: using the first pixel of the first and second scan lines of the left camera to calculate the intermediate value and perform supplementary pixels;
17. R3-1: the first pixel of the third scan line of the right camera;
18. R3+R4-1: using the first pixel of the third and fourth scan lines of the right camera to calculate the intermediate value and perform supplementary pixels;
19. R4-1: the first pixel of the fourth scan line of the right camera;

5. SPECIFIC EMBODIMENT OF THE INVENTION

Take the video signals of the left and right 2K video cameras into the PC with the HDMI cables of the capture card respectively. According to the program parallax barrier type and dual sequence of the present invention, a 4K 3D video stream is synthesized.

According to the Embodiment 1, it is viewed through a polarized glasses type, convex lens type 4K 3D display.

According to Embodiment 2, it is viewed through a 4K 3D display with polarized glasses.

According to Embodiment 3, it is viewed through a parallax barrier or a lenticular 4K 3D display.

In the medical field, surgery under a microscope is performed by viewing 3D (stereoscopic) images. In endoscopic surgery, 2D (planar) images are mostly performed by observing a monocular eyepiece or viewing a 2D video monitor. Two-dimensional (planar) images have no front and rear depth information. Moreover, the operator maintains the same posture for a long time and basically remains motionless. Therefore, the operator is expected to perform 3D video surgery. At present, product development of high-definition video equipment of 2K, 4K and 8K is underway, approaching the amount of information (resolution, fineness, tone, color space) observed with the naked eye. According to the invention, approximately 4K image quality information can be observed in a 2K camera, and approximately 8K image quality information can be observed in a 4K camera. In addition, 2K image quality information can be roughly observed as 3D video in a 1K video camera. Not only in the medical field, the invention can also be used for 3D image production and people's livelihood purposes.

What is claimed is:

1. A 3D video synthesis (encoding) method for viewing 3D (three-dimensional) 8K image quality with 4K cameras, comprising: the left (or right) image outputs the first scan line pixels on the first scan line (odd-numbered row) of the display to be configured sequentially in a manner of skipping one pixel, that is, only configured in odd-numbered columns; skip the first scan line pixel of the right (or left) image from the second column on the second scan line (even-numbered row) of the display, that is, only configured after even-numbered columns; similarly, a computer system that handles a 3D video synthesis (encoding) system is provided that distributes left and right image inputs to each pixel;

wherein: the left (or right) image outputs the first scan line pixels on the first scan line (odd-numbered row) of the display and configures them sequentially in a manner of skipping one pixel, i.e. only configured as odd-numbered columns, that is, only configured as odd-numbered columns; configure the first scan line pixels of the right (or left) image to skip one configuration from the first column on the second scan line (even-numbered row) of the display, that is, only configured as odd-numbered columns; thereafter, in the same way, the left and right image inputs are allocated to each pixel, and the skipped pixel is used as an intermediate value calculated from two adjacent pixels on the left and right sides to perform 3D video synthesis (encoding) processing.

2. The 3D video synthesis (encoding) method for viewing 3D (three-dimensional) 8K image quality with 4K cameras of claim 1, wherein: the left (or right) image outputs the first scan line pixels on the first scan line (odd-numbered row) of the display to be configured sequentially in a manner of skipping one pixel, that is, only configured in odd-numbered columns; skip the first scan line pixel of the right (or left) image from the second column on the first scan line (even-numbered row) of the display, that is, only configured in even-numbered columns; thereafter, in the same way, the left and right image inputs are allocated to each pixel, and the skipped pixel is used as an intermediate value calculated from two adjacent pixels above and below it to perform 3D video synthesis (encoding) processing.

* * * * *